United States Patent

Ruhlmann et al.

[11] Patent Number: 5,928,387
[45] Date of Patent: Jul. 27, 1999

[54] DYE MIXTURES, PROCESS FOR THEIR PREPARATION AND THEIR USE

[75] Inventors: Edmond Ruhlmann, Saint-Louis, France; Laszlo Fekete, Bettingen, Switzerland

[73] Assignee: Ciba Specialty Chemicals Corporation, Tarrytown, N.Y.

[21] Appl. No.: 08/937,833

[22] Filed: Sep. 25, 1997

[30] Foreign Application Priority Data

Sep. 26, 1996 [CH] Switzerland ............... 2360/96

[51] Int. Cl.⁶ .................................. C09B 62/00
[52] U.S. Cl. .................. 8/549; 8/641; 534/588
[58] Field of Search .............. 8/549, 641; 534/588

[56] References Cited

U.S. PATENT DOCUMENTS

| | | | |
|---|---|---|---|
| 5,232,462 | 8/1993 | Tzikas ............... | 8/549 |
| 5,451,665 | 9/1995 | Tzikas ............... | 534/618 |
| 5,552,532 | 9/1996 | Klier et al. ......... | 534/612 |
| 5,684,138 | 11/1997 | Klier et al. ......... | 534/612 |

FOREIGN PATENT DOCUMENTS

| | | |
|---|---|---|
| 0625551 | 11/1994 | European Pat. Off. |
| 1461125 | 1/1977 | United Kingdom. |
| 1529645 | 11/1978 | United Kingdom. |
| 2085908 | 5/1982 | United Kingdom. |
| 93/18224 | 9/1993 | WIPO. |

*Primary Examiner*—Margaret Einsmann
*Attorney, Agent, or Firm*—Jacob M. Levine; David R. Crichton

[57] ABSTRACT

Dye mixtures comprising at least one dye of formulae

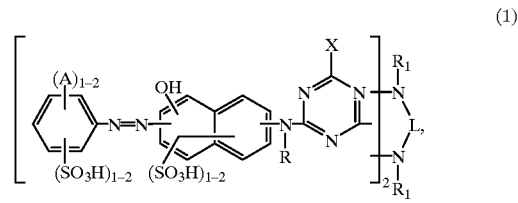

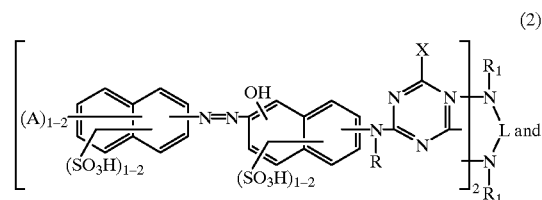

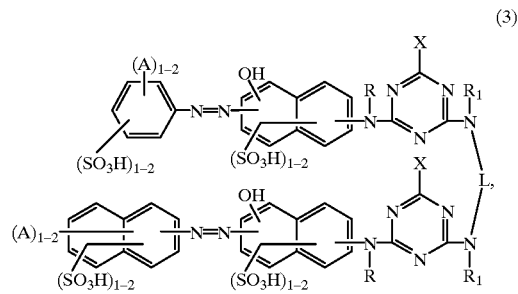

wherein A is hydrogen or a substituent, R and $R_1$ are hydrogen or $C_1$–$C_4$alkyl, X is halogen and L is an aliphatic linking group containing 1 to 12 carbon atoms, are suitable for dyeing cellulosic fiber materials.

7 Claims, No Drawings

DYE MIXTURES, PROCESS FOR THEIR PREPARATION AND THEIR USE

The present invention relates to novel improved reactive dye mixtures which are particularly suitable for dyeing cellulosic fibre materials by the processes customarily employed for reactive dyes and which give dyeings that are fast to wet treatment and light; as well as to a process for the preparation of these dye mixtures and to their use for dyeing or printing textile materials.

This invention relates to dye mixtures comprising at least one dye of formulae

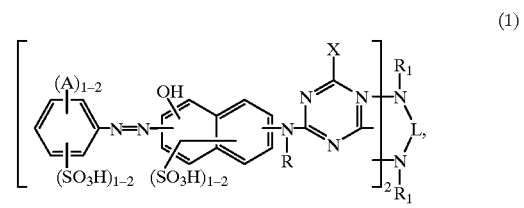
(1)

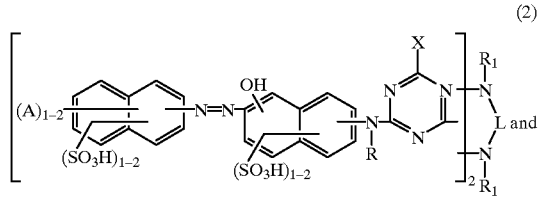
(2)

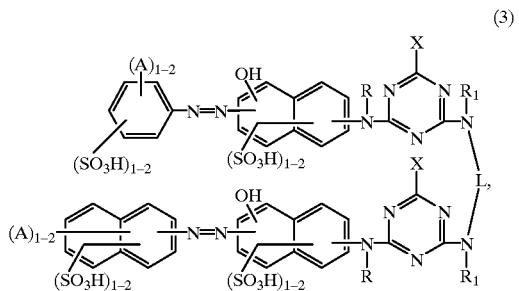
(3)

wherein A is hydrogen or a substituent, R and $R_1$ are hydrogen or $C_1$–$C_4$alkyl, X is halogen and L is an aliphatic linking group containing 1 to 12 carbon atoms.

In the dye mixtures of this invention, substituent A may preferably be: $C_1$–$C_4$alkyl, typically methyl, ethyl, n-propyl, isopropyl, $C_1$–$C_4$alkoxy, typically methoxy, ethoxy, isopropoxy, halogen, typically fluoro, bromo or, preferably, chloro, and also carboxy.

$C_1$–$C_4$Alkyl R and $R_1$ may preferably be methyl, ethyl, n-propyl, isopropyl or n-butyl. $C_1$–$C_4$-Alkyl R is preferably methyl.

X defined as halogen is chloro, bromo or, preferably, fluoro.

L is preferably a $C_2$–$C_{12}$alkylene radical which may be interrupted by 1, 2 or 3 —O— radicals. L is particularly preferably a $C_2$–$C_6$alkylene radical. Linking groups L of formulae: —$CH_2$—, —$CH_2$— $CH_2$—, —$(CH_2)_3$—, —$CH_2$—-$CH(CH_3)$—, —$(CH_2)_4$—, —$(CH_2)_5$—; —$(CH_2)_6$— are very particularly preferred.

In the novel mixtures of the dyes of formulae (1), (2) and (3), A, X, R, $R_1$ and L are preferably identical.

Particularly preferred dye mixtures are those, wherein A is hydrogen. Also particularly preferred dye mixtures are those, wherein A is methoxy.

Dye mixtures which are likewise preferred are those, wherein R and $R_1$ are hydrogen.

Those dye mixtures are very particularly preferred, wherein A, R and $R_1$ are hydrogen.

A very important dye mixture is that of the dyes of formulae

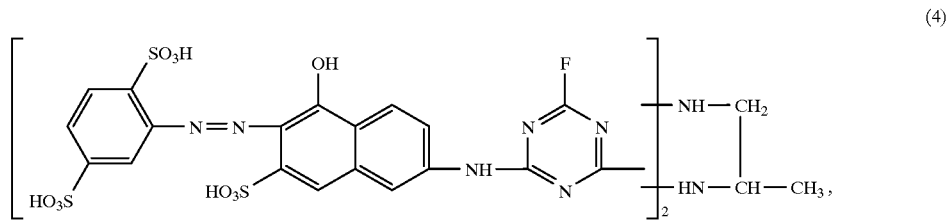
(4)

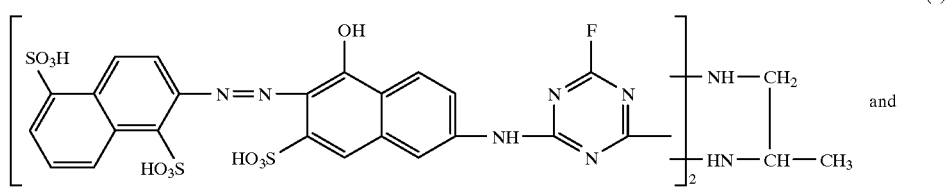
(5)

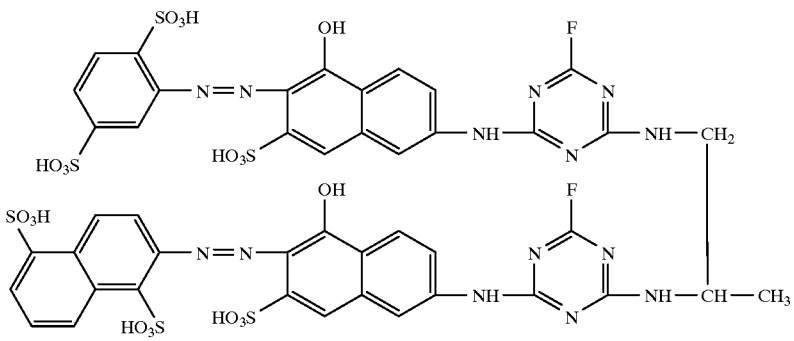

(6)

In another of its aspects, this invention relates to a process for the preparation of these dye mixtures, which comprises reacting a dye of formula

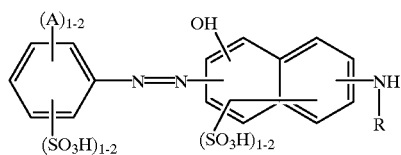

(7)

and a dye of formula

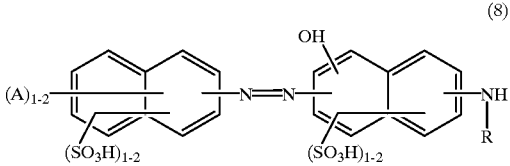

(8)

with cyanuric halide and then with a diamine of formula $H(R_1)N-L-N(R_1)H$ (9), wherein A, R, $R_1$, X and L have the meanings stated above.

It is preferred to first react a cyanuric halide, preferably cyanuric fluoride, with about half the stoichiometric amount of each of the compounds of formulae (7) and (8) at a temperature of −5° to 20° C., preferably of 0 to 5° C., the pH being kept in the neutral to acid range, preferably at 2 to 7, most preferably at 2 to 4, by addition of suitable bases, typically alkali metal bases, such a lithium hydroxide, sodium hydroxide or potassium hydroxide, or lithium carbonate, sodium carbonate or potassium carbonate. At least stoichiometric amounts of the diamine of formula (9) are conveniently added to the reaction mixture so obtained and the reaction is brought to completion at a slightly elevated temperature, preferably in the range from 10 to 60° C., most preferably from 15 to 30° C., and at a neutral to alkaline pH, preferably from 7 to 10, most preferably from 9 to 10.

Cyanuric halide may be, in particular, cyanuric chloride and, preferably, cyanuric fluoride.

The important dye mixture of the dyes of formulae (4), (5) and (6) is prepared by reacting a dye of formula

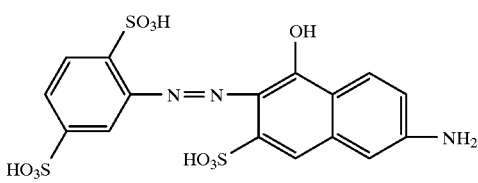

(10)

and a dye of formula

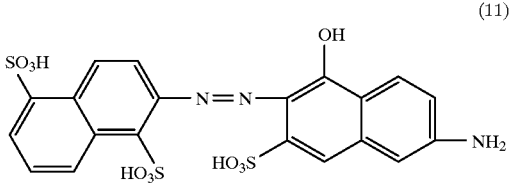

(11)

with cyanuric fluoride and then with propane-1,2-diamine.

The dyes of formulae (7) and (8) are known per se or can be prepared in general accordance with known dyes by diazotising a benzene diazo component or a naphthalene diazo component and coupling the diazonium compounds so obtained to an aminonaphtholsulfonic acid or an aminonaphtholdisulfonic acid.

Diamines of formula (9) may be for example: $H_2N-CH_2-NH_2$, $H_2N-(CH_2)_2-NH_2$, $H_2N-(CH_2)_3-NH_2$, $H_2N-CH_2-CH(CH_3)-NH_2$, $H_2N-(CH_2)_6-NH_2$, $NH(CH_3)-CH_2-CH_2-NH(CH_3)$, $NH_2-CH_2-CH_2-NH(C_2H_5)$, $NH_2-CH_2-CH_2-CH_2-NH(CH_3)$, $H_2N-CH(C_2H_5)-CH_2-CH_2-NH_2$, $H_2N-CH_2-C(CH_3)_2-CH_2-NH_2$, $H_2N-CH_2-CH_2-CH_2-CH(CH_3)-CH_2-NH_2$, $H_2N-(CH_2)_3-O-(CH_2)_4-O-(CH_2)_3-NH_2$, $H_2N-(CH_2)_2-O-(CH_2)_2-O-(CH_2)_2-NH_2$.

The compounds of formulae (1), (2) and (3) contain at least two sulfo group, each of which is either present in the form of the free acid or preferably as a salt thereof. Examples of suitable salts include alkali metal salts, alkaline earth metal salts or ammonium salts, salts of an organic amine or mixtures thereof. Examples include sodium salts, lithium salts, potassium salts or ammonium salts, the salt of mono-, di- or triethanolamine or sodium/lithium mixed salts or sodium/lithium/ammonium mixed salts.

The reactive dye mixtures are suitable for dyeing and printing a very wide range of materials, such as silk, leather, wool, polyamide fibres and polyurethanes and, in particular, cellulosic fibre materials of all kinds. Such fibre materials are, for example, the natural cellulose fibres, such as cotton, linen and hemp, as well as cellulose and regenerated cellulose, e.g. viscose, and also modal fibres and their blends with cotton. The reactive dye mixtures are also suitable for dyeing or printing hydroxyl group-containing fibres which are components of blended fabrics, typically blends of cotton and polyamide or, in particular, polyester fibres.

The novel dye mixtures can be applied to, and fixed on, the fibre material by different methods, preferably in the form of aqueous dye solutions and printing pastes. They are suitable for dyeing by the exhaust process as well as by the pad dyeing process, in which the goods are impregnated with aqueous and, where appropriate, salt-containing, dye solutions and the dyes are fixed after treatment with alkali, or in the presence of alkali, with or without the application of heat. After being fixed, the dyeings or prints are thoroughly rinsed with cold and hot water, if desired with addition of an agent which acts as a dispersant and which promotes the diffusion of the unfixed dyes.

The reactive dye mixtures are distinguished by high reactivity, good fixation and excellent build-up. They can therefore be used in the exhaust dyeing process at low dyeing temperatures and require only short steaming times in the pad-steam process. The degree of fixation is high and unfixed dyes can be easily washed off, the difference between degree of exhaustion and degree of fixation being remarkably small, i.e. soap loss is very insignificant. The reactive dyes of formula (1) are in particular also suitable for printing, especially on cotton, but also for printing nitrogen-containing fibres such as wool or silk, or blends which contain wool or silk.

The dyeings and prints on cellulose fibre materials obtained with the novel dye mixtures have superior tinctorial strength and high fibre-dye bonding stability in the acid as well as in the alkaline range. In addition, they have good lightfastness and very good wetfastness properties, such as fastness to washing, water, seawater, cross-dyeing and perspiration, as well as good fastness to pleating, ironing and rubbing.

The invention is illustrated by the following Examples in which, unless otherwise stated, temperatures are given in degrees Celsius and parts and percentages are by weight. The ratio of parts by weight to parts by volume is the same as that of the kilogram to the liter.

EXAMPLE 1

A neutral solution of 55.3 parts of the monoazo dye of formula

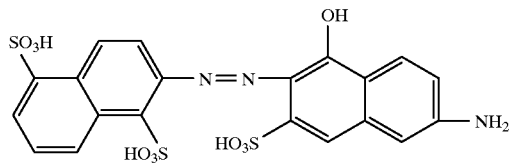

and 50.3 parts of the monoazo dye of formula

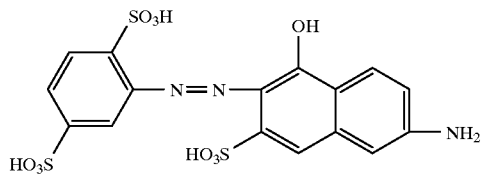

in 1400 parts of water is charged dropwise with 28 parts of cyanuric fluoride at a temperature of less than 2°. During the dropwise addition, the pH is kept constant by addition of aqueous sodium hydroxide solution. When the reaction is complete, a solution of 37 parts of propane-1,2-diamine in 60 parts of water is added dropwise such that the pH does not exceed 9.5, and subsequently the pH is kept constant at 9.5 by addition of aqueous sodium hydroxide solution. The solution is allowed to warm to room temperature and is then dialytically freed from salt, and the product so obtained is concentrated by evaporation. A dye mixture is obtained which comprises the following dyes given in the form of the free acid.

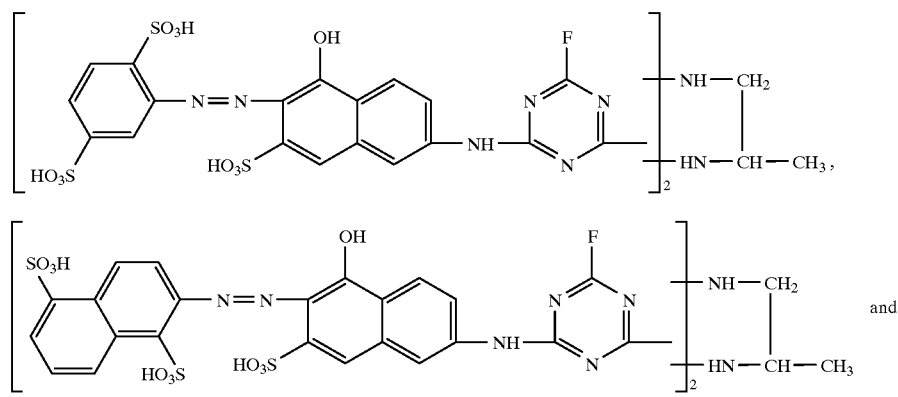

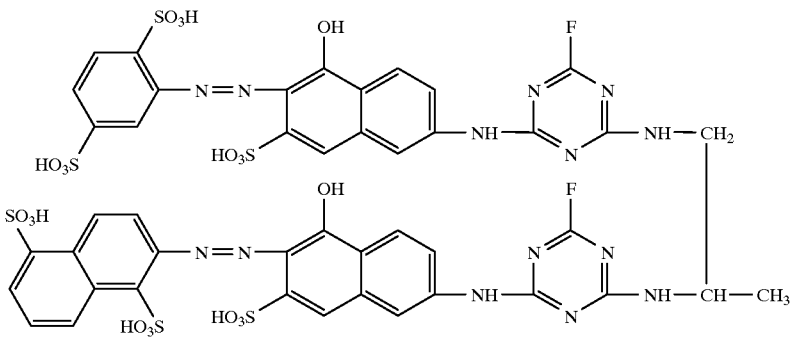

The dye mixture so obtained dyes cellulose fibres in an orange shade.

The above Example is repeated, but replacing propane-1,2-diamine with a diamine of formula $H_2N—(CH_2)_3—NH_2$ $H_2N—(CH_2)_6—NH_2$ $NH(CH_3)—CH_2—CH_2—NH(CH_3)$ $NH_2—CH_2—CH_2—NH(C_2H_5)$ $NH_2—CH_2—CH_2—CH_2—NH(CH_3)$ $H_2N—CH(C_2H_5)—CH_2—CH_2—NH_2$ $H_2N—CH_2—C(CH_3)_2—CH_2—NH_2$ $H_2N—CH_2—CH_2—CH_2—CH(CH_3)—CH_2—NH_2$ $H_2N—(CH_2)_3—O—(CH_2)_4—O—(CH_2)_3—NH_2$ $H_2N—(CH_2)_2—O—(CH_2)_2—O—(CH_2)_2—NH_2$ to give analogous dyes with corresponding alkylene linking groups, which dyes dye cotton in an orange shade.

Repeating Example 1, but replacing the monoazo dyes used therein with the following monoazo dyes in equimolar amounts and using as diamine not propane-1,2-diamine but the diamines cited in the following Examples in equimolar amounts, gives the mixtures indicated hereinbelow:

EXAMPLE 2

Monoazo compounds of formulae

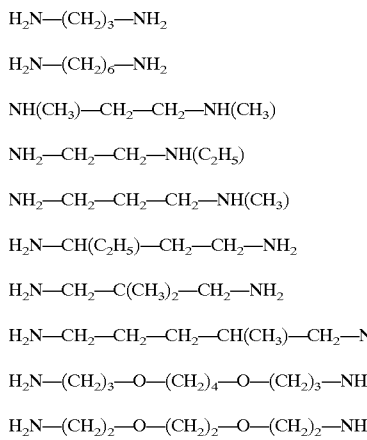

and diamine: 1,2-ethylenediamine

A dye mixture is obtained which comprises the following dyes given in the form of the free acid:

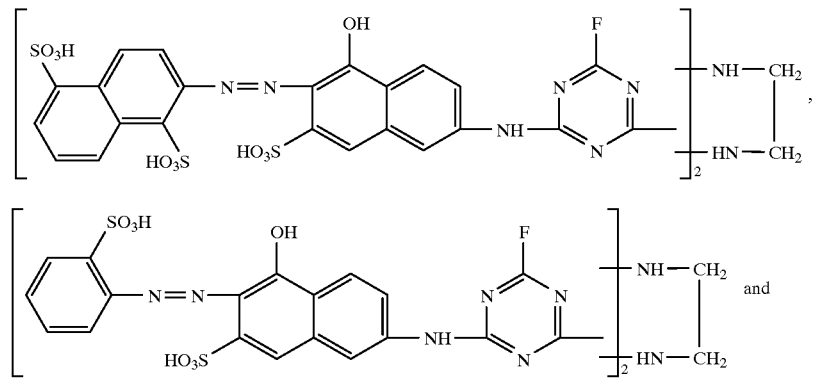

and

-continued
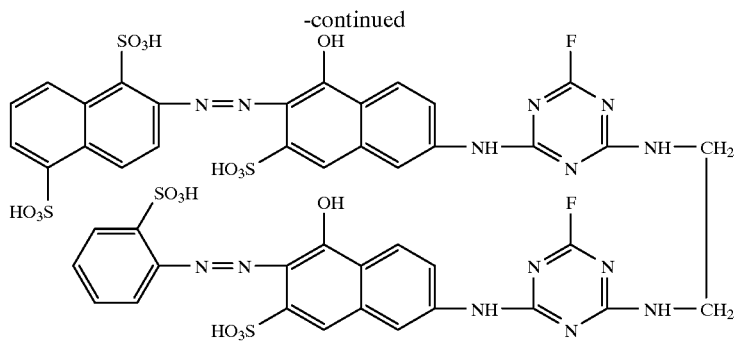
The dye mixture so obtained dyes cellulose fibres in an orange shade.
EXAMPLE 3
Monoazo compounds of formulae
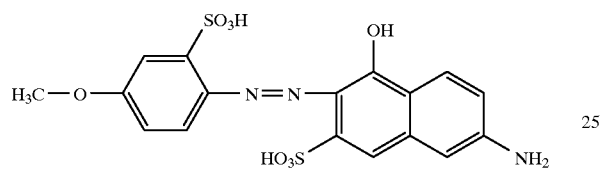
and
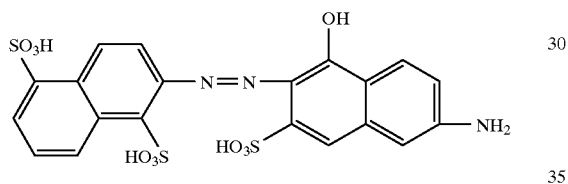
diamine: propane-1,2-diamine
A dye mixture is obtained which comprises the following dyes given in the form of the free acid:
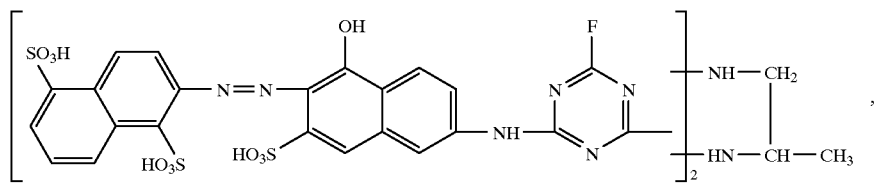
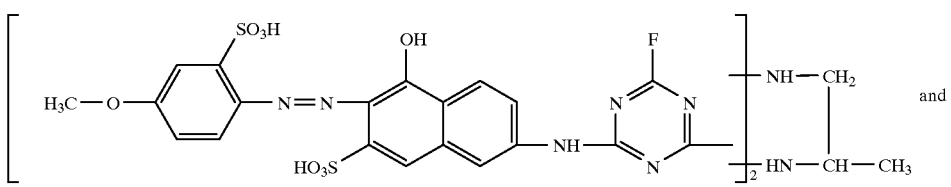
and

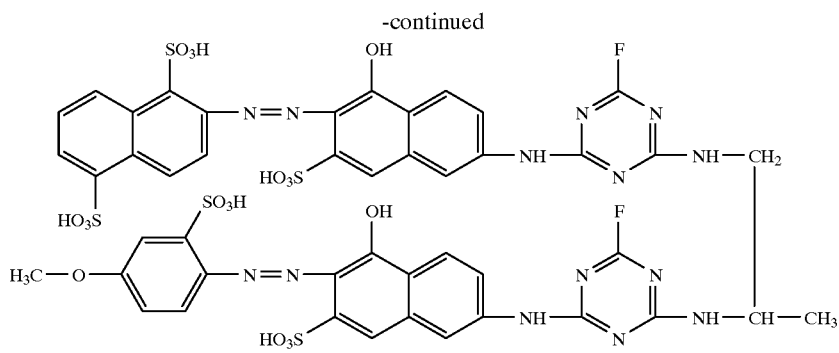
The dye mixture so obtained dyes cellulose fibres in an orange shade.
EXAMPLE 4
Monoazo compounds of formulae
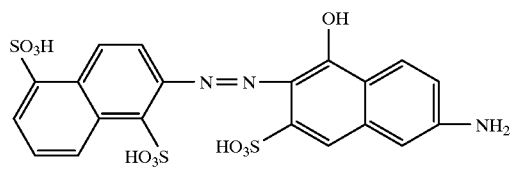
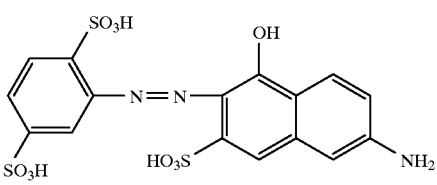
and
diamine: 1,2-ethylenediamine
A dye mixture is obtained which comprises the following dyes given in the form of the free acid:
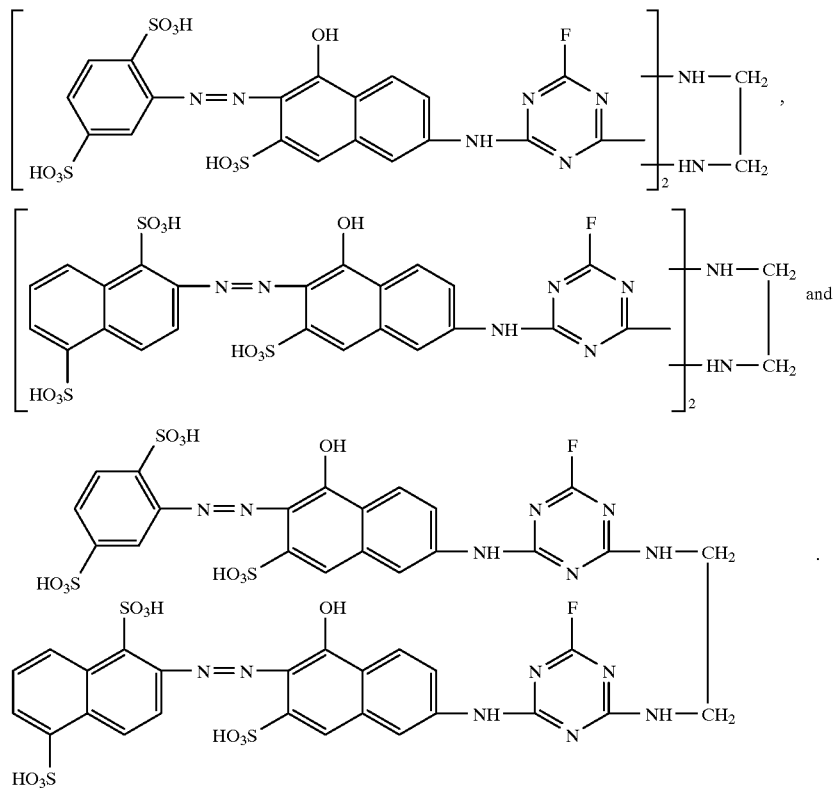

The dye mixture so obtained dyes cellulose fibres in an orange shade.

Dyeing Procedure 2 parts of the reactive dye mixture obtained in Example 1 are dissolved in 400 parts of water. To this solution are added 1500 parts of a solution which contains 53 g/l of sodium chloride. 100 parts of cotton fabric are put into this dye bath at 40° and, after 45 minutes, 100 parts of a solution containing 16 g/l of sodium hydroxide and 20 g/l of calcined sodium carbonate are added. The dyed goods are then rinsed, soaped at the boil for a quarter of an hour with a nonionic detergent, rinsed again and dried.

Printing Procedure 3 parts of the reactive dye mixture obtained in Example 1 are sprinkled, with rapid stirring, into 100 parts of a stock thickening which contains 50 parts of 5% sodium alginate thickening, 27.8 parts by weight of water, 20 parts of urea, 1 part of sodium m-nitrobenzene sulfonate and 1.2 parts of sodium hydrogen carbonate. A cotton fabric is printed with the printing paste so obtained and the resulting printed fabric is then dried and steamed for 2 minutes at 102° in saturated steam. The printed fabric is then rinsed, if necessary soaped at the boil, then rinsed once more and subsequently dried.

What is claimed is:

1. A dye mixture, comprising at least one dye of each of formulae

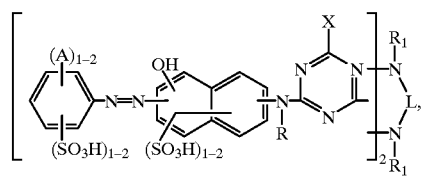

(1)

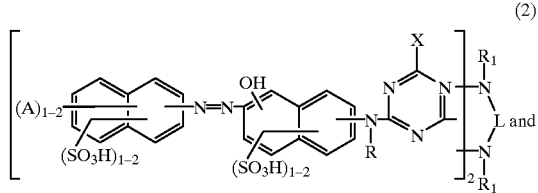

(2)

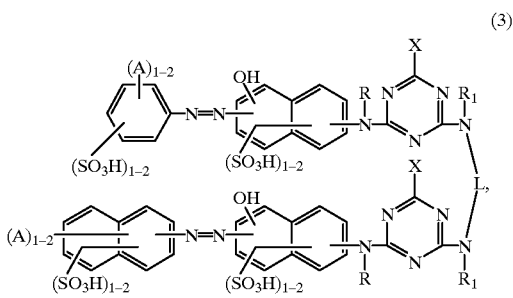

(3)

wherein A is hydrogen, $C_1$–$C_4$alkyl, $C_1$–$C_4$alkoxy, halogen, or carboxy, R and $R_1$ are hydrogen or $C_1$–$C_4$alkyl, X is halogen and L is an aliphatic linking group containing 1 to 12 carbon atoms.

2. A dye mixture according to claim 1, wherein X is fluoro.

3. A dye mixture according to claim 1, wherein A is hydrogen.

4. A dye mixture according to claim 1, wherein A, R and $R_1$ are hydrogen.

5. A dye mixture according to claim 1, which comprises at least one dye of each of formulae

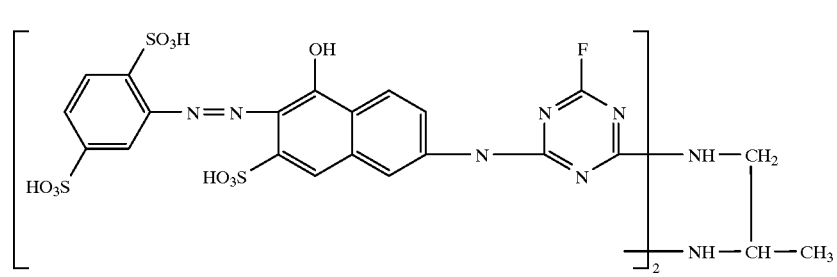

(4)

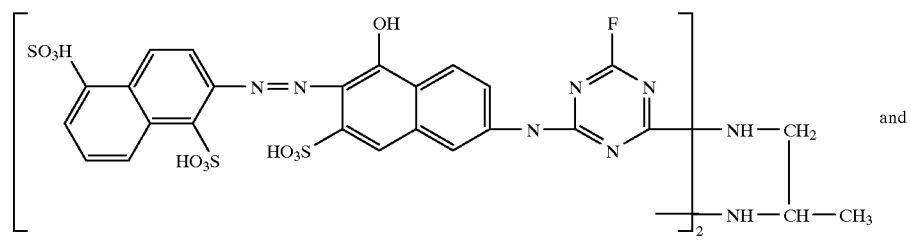

(5)

and

-continued

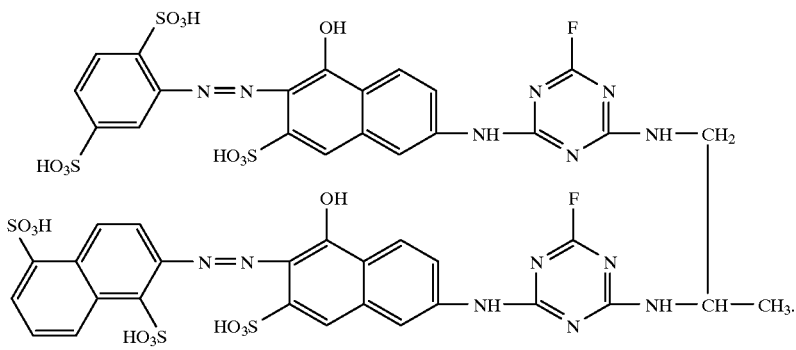

6. A process for the preparation of the dye mixture as claimed in claim 1, which comprises reacting a dye of formula

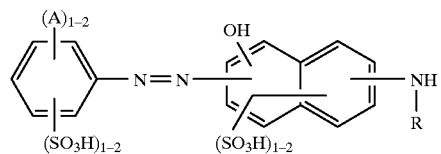

and a dye of formula

with cyanuric halide and then with a diamine of formula $$H(R_1)N-L-N(R_1)H \quad (9)$$

wherein A, R, $R_1$, X and L have the meanings claimed in claim 1.

7. A process for dyeing or printing cellulosic fibre materials which comprises applying to said fibre material a tinctorially effective amount of a dye mixture according to claim 1.

* * * * *